United States Patent
Torres Martinez

(10) Patent No.: US 7,836,933 B2
(45) Date of Patent: Nov. 23, 2010

(54) FIBER STRIP SPLICER FOR TAPING MACHINES

(76) Inventor: Manuel Torres Martinez, C/ Sancho el Fuerte, 21, Pamplona, (Navarra) (ES) 31007

( * ) Notice: Subject to any disclaimer, the term of this patent is extended or adjusted under 35 U.S.C. 154(b) by 259 days.

(21) Appl. No.: 12/035,188

(22) Filed: Feb. 21, 2008

(65) Prior Publication Data

US 2008/0202693 A1 Aug. 28, 2008

(30) Foreign Application Priority Data

Feb. 22, 2007 (ES) .................................. 200700459

(51) Int. Cl.
*B65H 19/20* (2006.01)
*B65H 21/00* (2006.01)

(52) U.S. Cl. .................. 156/506; 156/157; 156/159; 156/502; 242/553; 242/556

(58) Field of Classification Search ............. 156/502, 156/504, 157, 159, 581, 583.1, 506; 242/553, 242/555.1, 555.4, 556

See application file for complete search history.

(56) References Cited

U.S. PATENT DOCUMENTS

| | | | | | |
|---|---|---|---|---|---|
| 3,841,944 | A | * | 10/1974 | Harris, Jr. | 156/504 |
| 4,284,463 | A | * | 8/1981 | Wright | 156/502 |
| 4,331,301 | A | * | 5/1982 | Martinez | 156/502 |
| 5,393,363 | A | * | 2/1995 | Fournier | 156/157 |
| 5,514,237 | A | * | 5/1996 | Emenaker et al. | 156/159 |
| 6,500,288 | B2 | * | 12/2002 | Hara et al. | 156/159 |

* cited by examiner

*Primary Examiner*—Kat Wyrozebski
*Assistant Examiner*—Scott W Dodds
(74) *Attorney, Agent, or Firm*—Lucas & Mercanti, LLP

(57) ABSTRACT

The invention relates to a fiber strip splicer for taping machines, formed by two mobile assemblies comprising respective modules (6,6') between which the capture for joining the fiber strip (3) that is being fed to the application process and a strip (3') intended to continue with the supply when the first strip ends is possible, the modules (6, 6') incorporating heating means (10) to activate the fiber strips in the joining, a blade for cutting the excess of the finished fiber strip (3) after the joint, and a catch (16) for securing the end of the new fiber strip (3') on standby for the joining.

2 Claims, 8 Drawing Sheets

FIBER STRIP SPLICER FOR TAPING MACHINES

FIELD OF THE INVENTION

The present invention relates to a splicer for joining synthetic fiber strips used in taping machines, and more particularly to a splicer for automatically joining a strip coming from a reel that is ending and a strip coming from a new feed reel.

BACKGROUND OF THE INVENTION

Synthetic fibers, such as carbon fiber or glass fiber, are applied to produce increasingly larger parts and in larger amounts. This requires adapting the productivity of the taping machines.

To that end, machines have been developed with applicator heads for simultaneously applying multiple fiber strips, and reducing the time for manufacturing the parts, thus solving the condition of a low application speed.

The increase of the performance of the applicator heads for applying the fiber strips has made certain aspects, such as the fiber strip feed system, acquire a main role in the overall performance of taping machines due to the following reasons:

Upon eliminating the main bottleneck of taping machines, which was the capacity of dispensing the material to be applied, there are other factors which have now become productivity limiting factors, such as the downtimes necessary for reloading the tape reels as they run out.

The high productivity generally requires high speeds, accelerations and dynamics in the supply of the fiber strips, such that the feed must be able to supply the material in the conditions and at the pace required by the applicator head, while maintaining the control of the tension required in the application.

Since the optimal productivity is sought for each application, the width of the application web is large in many cases, which requires design criteria and precautions stricter than those usually used for handling narrower webs.

Up until now, the feed reels in the heads of machines for applying fiber strips were replaced by stopping the machine, manually splicing the strip of the finished reel to the strip of the new feed reel, since there were no automatic splicers in this field of synthetic fibers.

However, in a high performance machine it may be necessary to change the reels every five or ten minutes. Each reel change is done by a manual process and results in machine downtime. Such idle time considerably limit the productivity of the machines.

SUMMARY OF THE INVENTION

According to the invention, an automatic splicer for joining fiber strips is proposed, whereby the downtime for replacing fiber strip feed reels in machines for applying the strips is virtually eliminated.

The proposed splicer has a fiber strip circulation passage, defined by pulleys determining two arrival paths for arriving at the circulation passage in opposing positions. Respective modules are on the sides of the path for the passage through the splicer. The modules can move closer to or away from the central area through which the fiber strip pass. Each module is provided with a heating means, a cutting means and a means for capturing the end of the fiber strips.

The arrangement allows the fiber strip which is being supplied to the application process, to pass freely through the splicer, and for preparing the fiber strip of a new feed reel in a standby position without interrupting the supply. When the reel of the fiber strip which is being supplied ends, the splicer automatically joins the fiber strip of the reel on standby with the fiber strip of the reel that is ending. The splicing is carried out in a very short time (about 2 seconds), therefore stopping the machine for splicing has virtually no effect on productivity.

The process for joining the fiber strips is carried out by means of positioning the fiber strips to be joined in mutual contact, with pressure and heat on the joint. This is carried out by means of moving the mobile modules of the splicer close to one another. Between the modules, the fiber strips are caught with a controlled pressure, while at the same time the heating means of the modules themselves supply the heat necessary to activate the resin of the fiber strips so that they are adhered to one another.

The cutting means of the module located on the side of the fiber strip coming from the finished reel, cuts the fiber strip from the finished reel in order to separate the excess. When the modules are separated again, the fiber strip feed continues with the supply from the new reel. The joint having virtually no effect on the application.

At the front of the modules, between which the fiber strips are caught, there are mutual insertion conformations, a recess in one of the modules and a corresponding projection in the other module. When pressure for joining the fiber strips is applied, the strips are located inside the insertion, thus preventing the width of the strips from being altered by the effect of the pressure. This maintains the suitable conditions for the application, because it is critical for the width of the assembly of the supplied fiber strip to be uniform.

The arrival paths of the fiber strip towards the circulation passage, through the splicer, are formed through tilt pulleys. The oscillations of the strips due to the unwinding in the corresponding reels are absorbed by the tilt pulleys.

The fiber strips are further joined with an overlapping section of the fiber strips on the order of 50 millimeters, which is within the overlapping section specifications of between 25 millimeters and 125 millimeters. The joint is sufficiently resistant and allows for the curvature of the passage though the drive pulleys without altering the supply towards the application.

The invention has certainly advantageous features, acquiring its own identity and a preferred character for joining fiber strips in processes for manufacturing parts by means of taping with the strips.

DETAILED DESCRIPTION OF THE INVENTION

Figure 1:
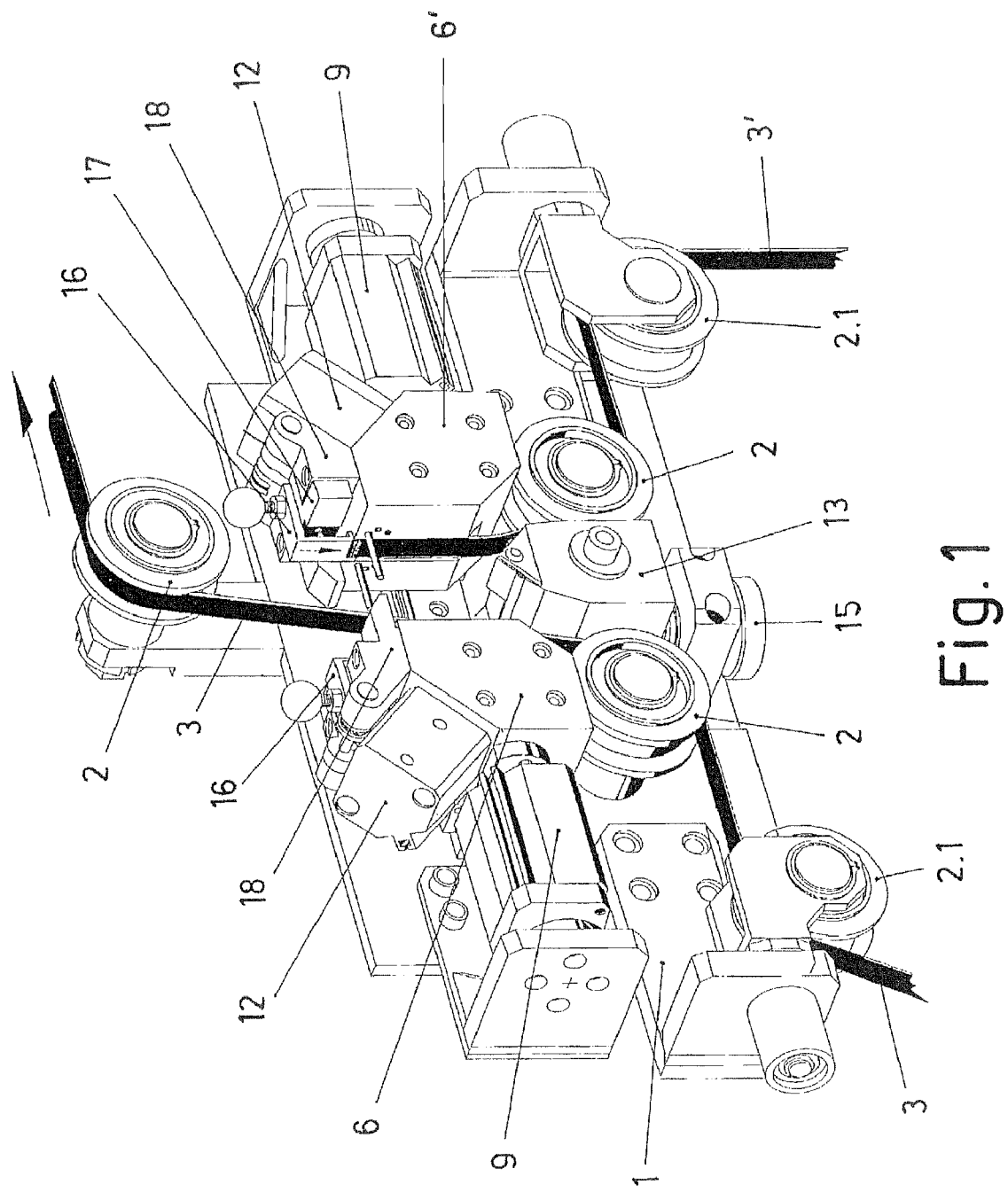
FIG. 1 shows a perspective view of the structural assembly of the splicer of the invention.
Figure 2:
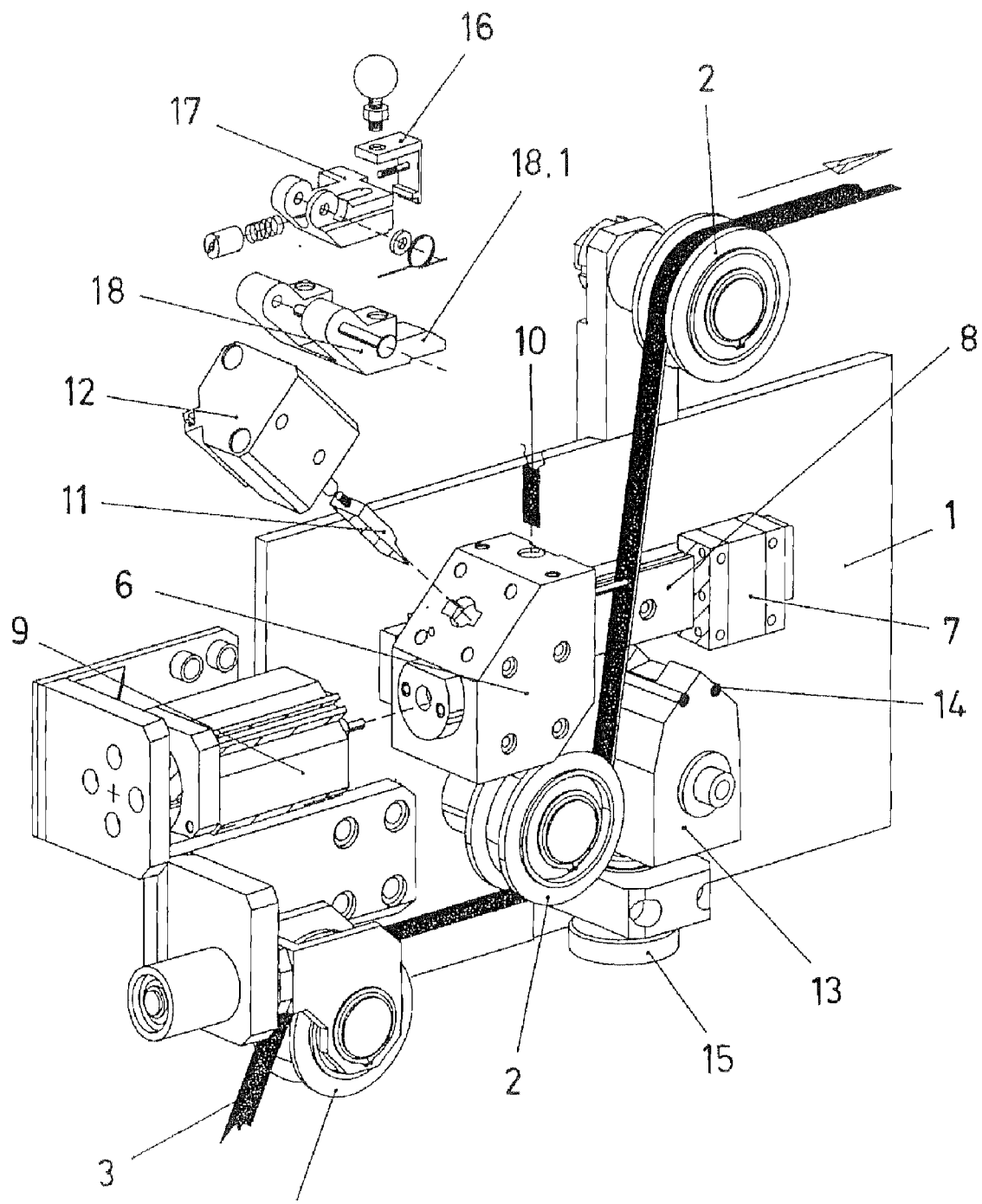
FIG. 2 shows an enlarged perspective view of one of the parts of the splicer, with the elements of the corresponding mobile module in an exploded arrangement.
Figure 3:
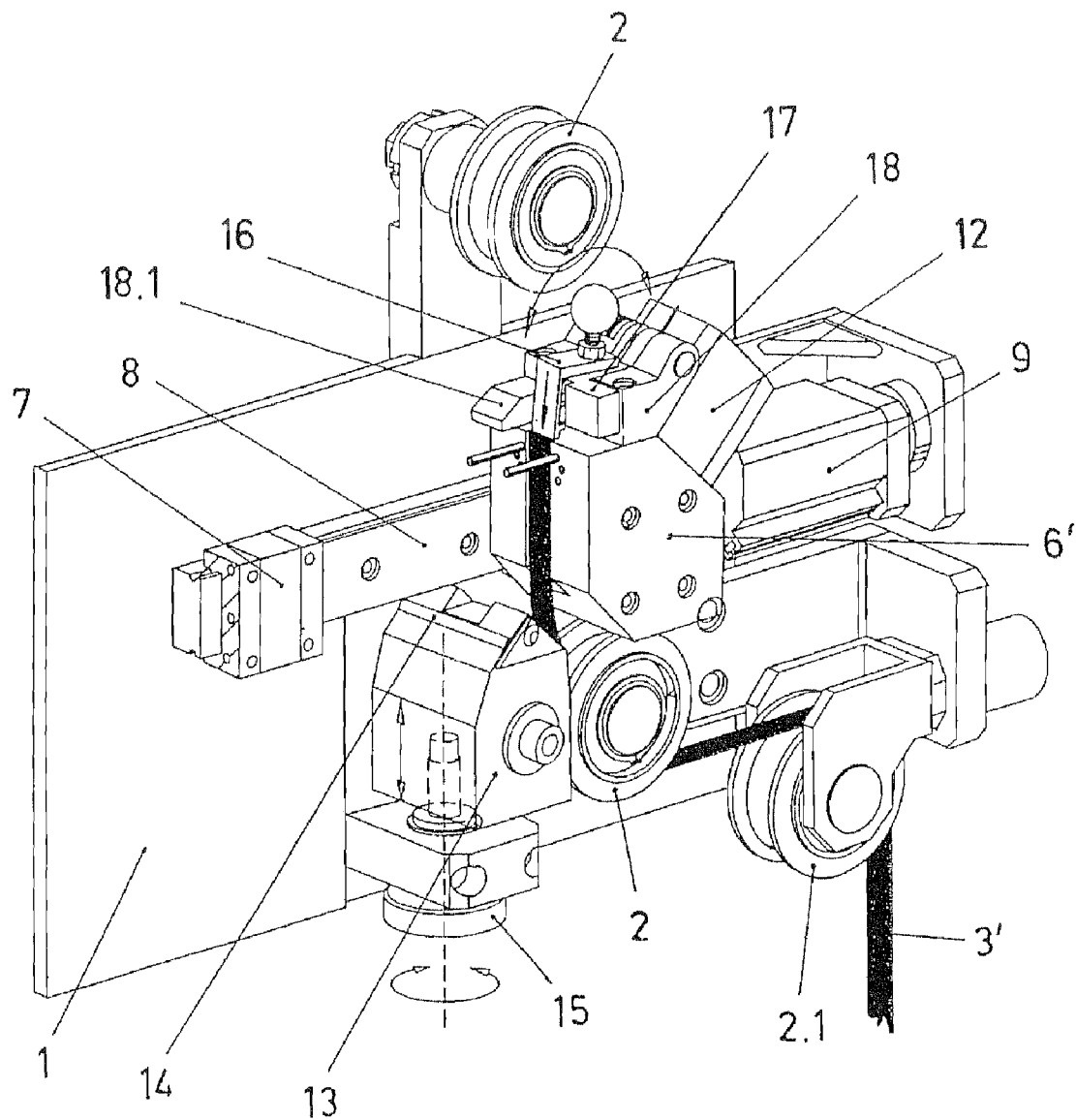
FIG. 3 shows an enlarged perspective view of the other part of the splicer, with the corresponding mobile module assembled.

The invention relates to a splicer intended to automatically join fiber strips. The splicer establishes the continuity of the fiber strip feed supply to the application processes by joining the fiber strip coming from a feed reel that is ending and the fiber strip of a new reel.

The splicer structurally has a frame (1) on which there are joined pulleys (2) which drive the fiber strips in a circulation passage, towards the application process.

The path of the fiber strips towards the circulation passage, through the splicer, is formed from two feed supply directions, of respective fiber strips (3, 3') coming from respective feed reels (4, 4') which can be independently arranged on respective shafts (5, 5').

At the entrance of the path of the fiber strips (3, 3') to the splicer, from the two feed supply directions, there are arranged respective entrance tilt pulleys (2.1). The tilt pulleys (2.1) absorb the orientation oscillations of the fiber strips (3, 3') as they arrive from the corresponding reels (4, 4') due to the unwinding. The arrival orientation oscillations do not affect the circulation passage of the fiber strips (3, 3') through the splicer.

On both sides of this circulation passage of the fiber strips (3, 3') through the splicer, there are arranged respective modules (6, 6'). Modules (6, 6') which are assembled by means of corresponding runners (7, 7') on a guide (8), having respective movement actuators (9, 9'). They allow independently actuating the movement of said modules (6, 6') closer to and away from the passage area of the fiber strips (3, 3'). The actuators (9, 9') can be pneumatic, magnetic, mechanical type actuators, etc.

Each of the modules (6, 6') is provided with heating means formed by one or more electric resistances (10) housed near the front oriented towards the passage area of the fiber strips (3, 3'). Each module (6, 6') has a cutting means formed by a blade (11) which can emerge from said front oriented towards the passage area of the fiber strips (3, 3') and an actuator (12) for forward and backward movement.

In the mid-part, under the passage area of the fiber strips (3, 3'), there is arranged a block (13). The upper part of block (13) has several planes on which the modules (6, 6') can be supported. Elastic dollies (14) are arranged in these planes of the block (13). The blades (11) of the modules (6, 6') impinging against the dollies, in the position of these modules against the mentioned planes of the block (13). To adjust the position of the block (13), so that the modules (6, 6') are suitably supported on the upper planes thereof, the block (13) can move vertically, having a vernier (15) which allows placing it at the suitable height.

Figure 4:
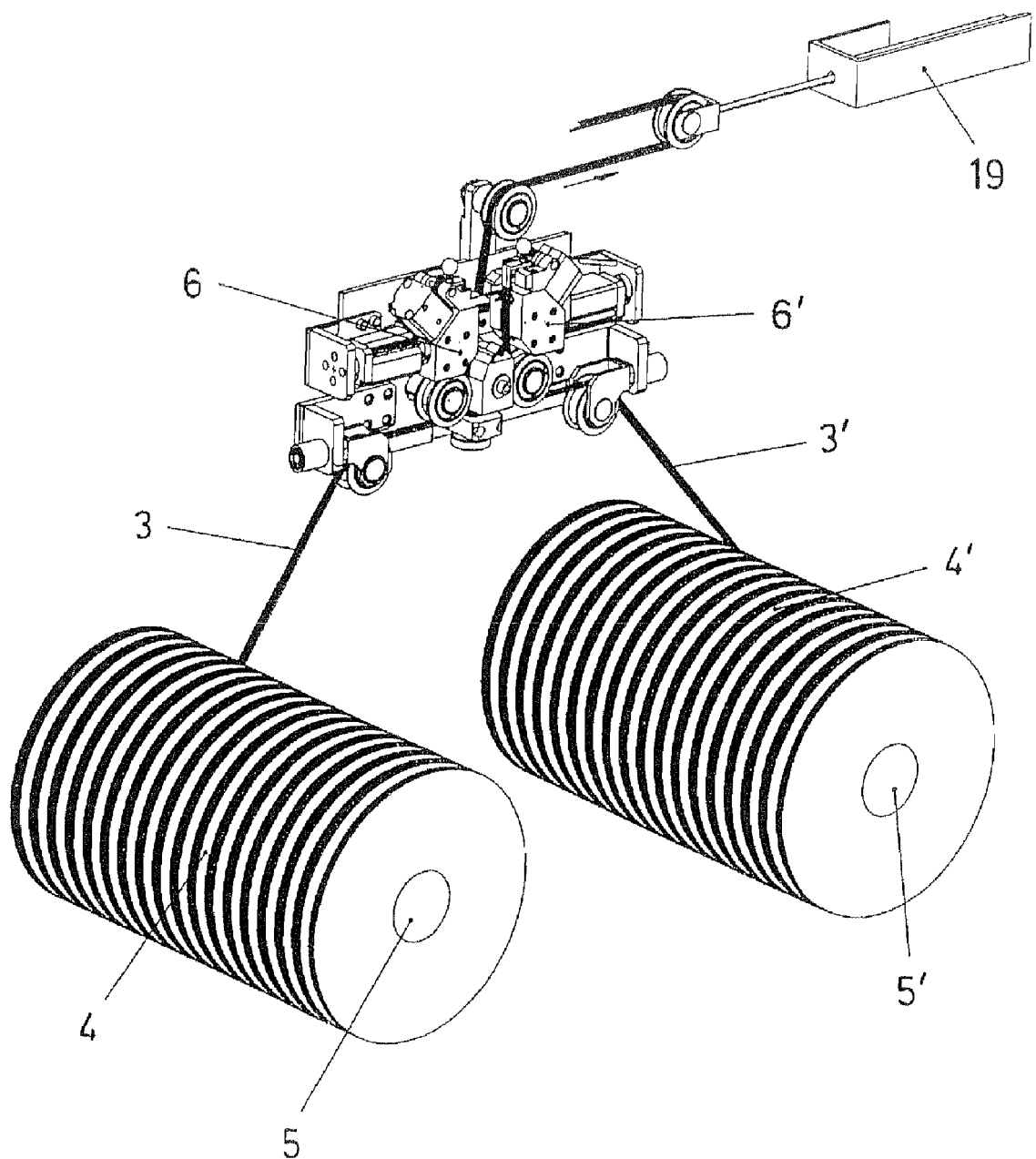
FIG. 4 shows a perspective view of the splicer feeding a fiber strip from a feed reel and with the fiber strip coming from another reel in a standby preparation process.

The passage of a fiber strip (3) coming from a feed reel (4) and directed towards the application is formed through the splicer. While the fiber strip (3) is being supplied, another reel (4') can be incorporated and the fiber strip (3') thereof can be prepared in a standby arrangement on the module (6') as shown in FIG. 4. This allows for the fiber strip (3) to be spliced with the fiber strip (3') for the purpose of continuing the feed supply towards the application from the new reel (4').

For the standby preparation of the corresponding strip (3, 3'), the modules (6, 6') are provided with a catch (16) incorporated in an adjustable manner on a support (17) tilting on a base (18). The end of the fiber strip (3, 3') can be caught in the corresponding module (6, 6') with the catch (16) by means of manual actuation.

Figure 5:
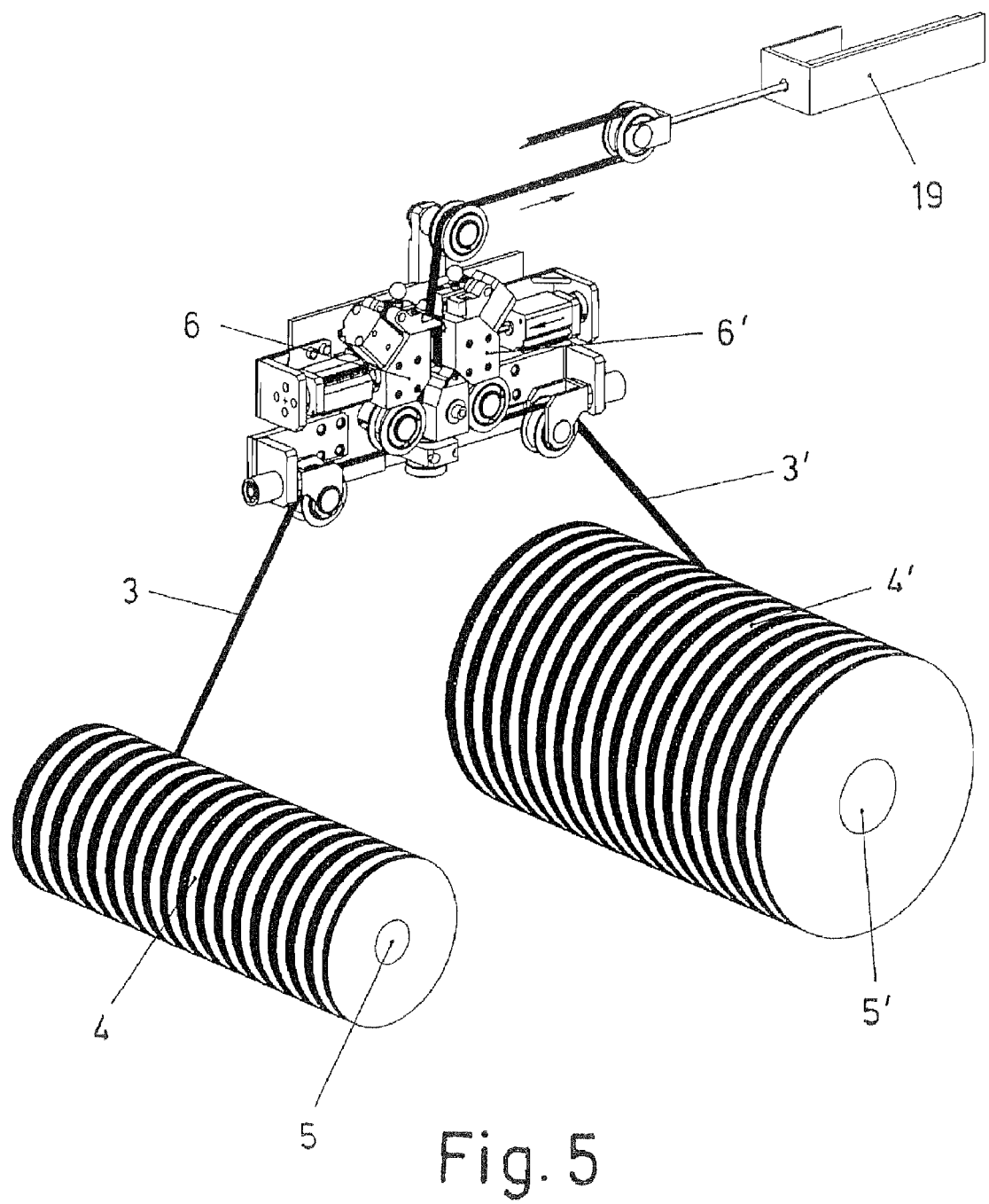
FIG. 5 shows a perspective view similar to the previous one, with a reel arranged in a standby situation and the reel whereby the feed being supplied is ending.

When the fiber strip (3, 3') on standby is captured in the corresponding catch (16), the respective module (6, 6') moves until being supported against the block (13). The fiber strip (3, 3') on standby is perfectly fixed in that positions, as shown in FIG. 5.

Figure 6:
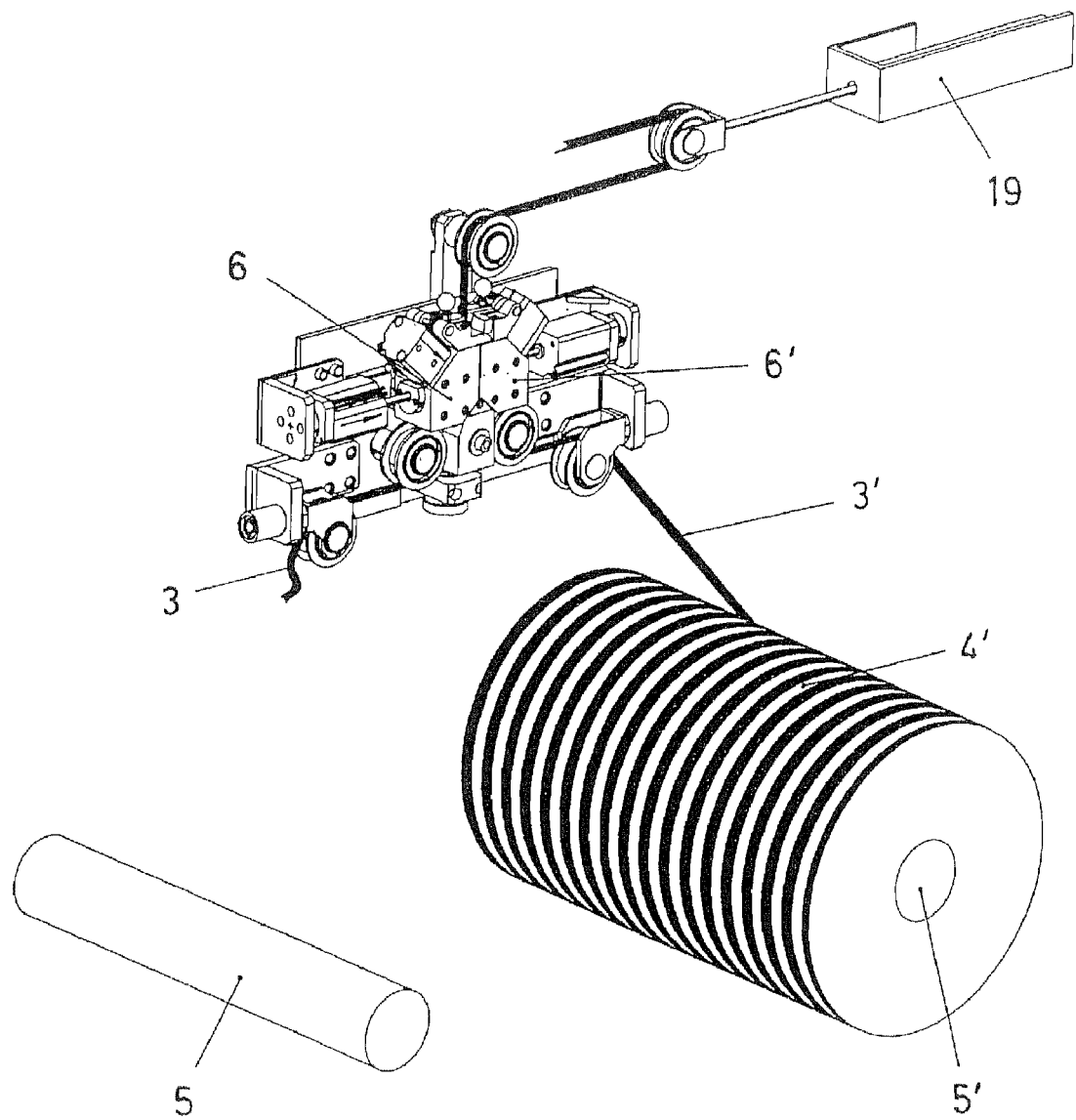
FIG. 6 shows the arrangement of the splicer at the time the fiber strips of the finished reel and the new reel on standby are joined.

In such conditions, when the reel (4) supplying the fiber strip (3) ends, the module (6) located on the side of this fiber strip (3) moves towards the module (6') in which the fiber strip (3') on standby is prepared. The two fiber strips (3 and 3') are captured between both modules, as shown in FIG. 6.

When the modules (6, 6') move close to one another, the base (18) of the catch (16) of each of them impinges with a front-side protrusion (18.1) on the catch (16) of the other module, making it tilt in a slight elevation. This frees the fiber strips (3, 3') from the action of the catches (16), thus achieving a perfect contact between the fiber strips (3, 3').

The fiber strips (3, 3') are captured between the modules (6, 6') with a controlled pressure (of the order of 2 bars), and at the same time, the capture area is heated (of the order of 50° C.) by means of the resistances (10) of the modules (6, 6'), whereby the resin of the fiber strips (3, 3') is activated such that said fiber strips (3, 3') adhere to one another.

During the capturing action, the blade (11) of the module (6) corresponding to the fiber strip (3) of the finished reel (4) moves forward and the excess of the fiber strip (3) is cut against the corresponding elastic dolly (14) at the level of the joint with the new fiber strip (3').

During the joining of the fiber strips (3, 3') the machine is stopped, but the productivity is not significantly affected due to the very short time (about 2 seconds) that the splicing operation last. Nevertheless, to prevent the feed supply to the fiber strip application process from being stopped, it is possible to incorporate a storage solution, after the splicer, in order to provide the feed supply to the application process during the splicing of the fiber strips.

Figure 7:
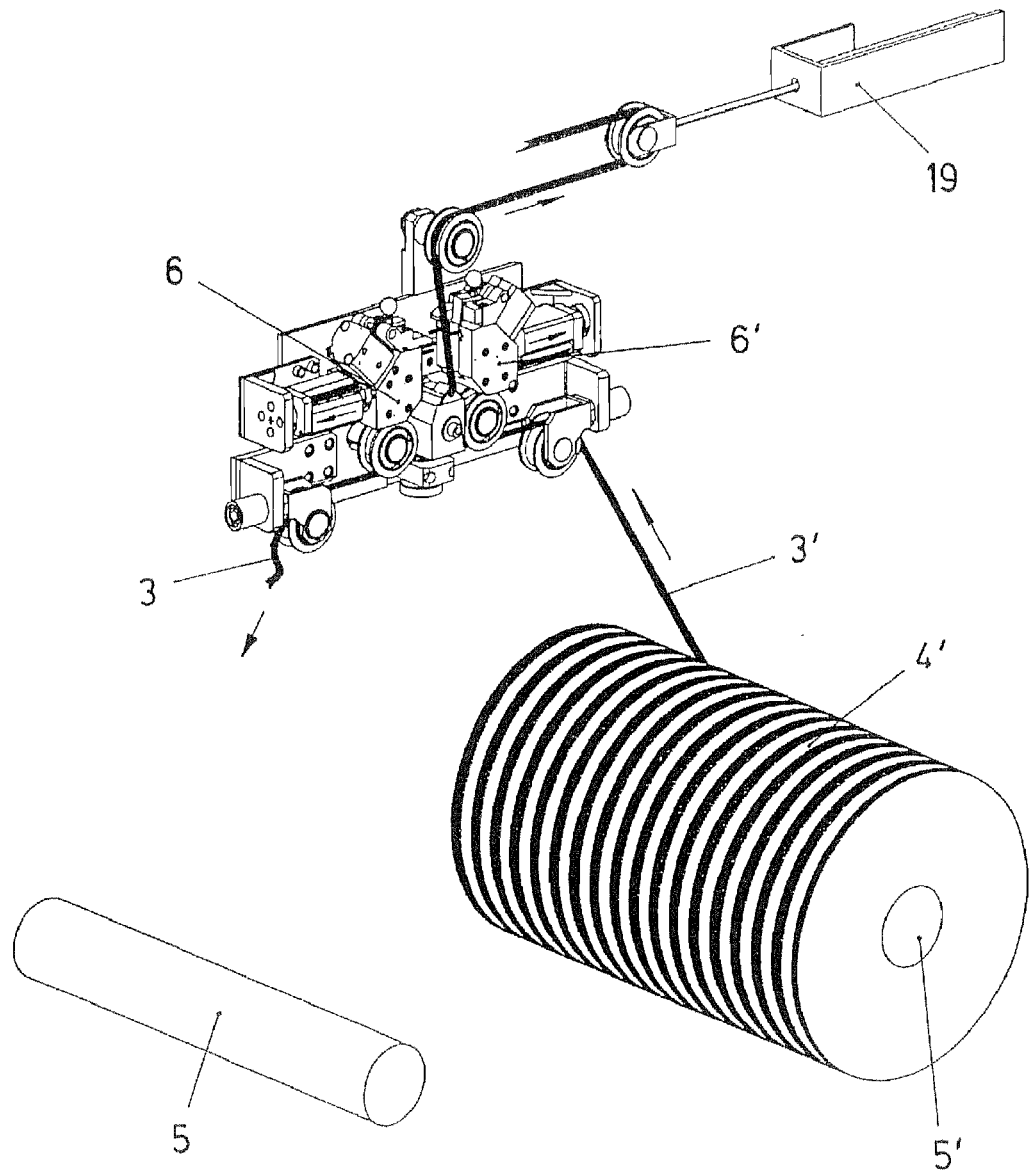
FIG. 7 shows the arrangement of the splicer at the opening time, after the fiber strips are joined, to continue the feed with the supply from the new reel.

Once the fiber strips (3, 3') are spliced, the modules (6, 6') are separated, the joint is released and the feed supply to the application process continues with the fiber strip (3') coming from the new reel (4'), as shown in FIG. 7. At this time, the excess of the finished fiber strip (3) can be removed and a new reel can be placed on the shaft (5) in order to prepare the fiber strip thereof in a standby arrangement on the module (6), for a subsequent change of the feed reel when reel (4') ends.

A device (19) is furthermore arranged at the outlet of the splicer, whereby the tension of the fiber strip (3, 3'), leaving towards the application process, is regulated in order to keep this tension constant, thus maintaining the suitable conditions for the application.

These suitable conditions for the application also require the width of the fiber strip to be constant. For this the modules (6, 6') of the splicer have mutual insertion conformations on their front, opposing faces. The module (6) having, for example, a projection (20), and the module (6') having a reciprocal recess (21) in correspondence with the width of the fiber strips (3, 3') and in the direction thereof.

Figure 8A:
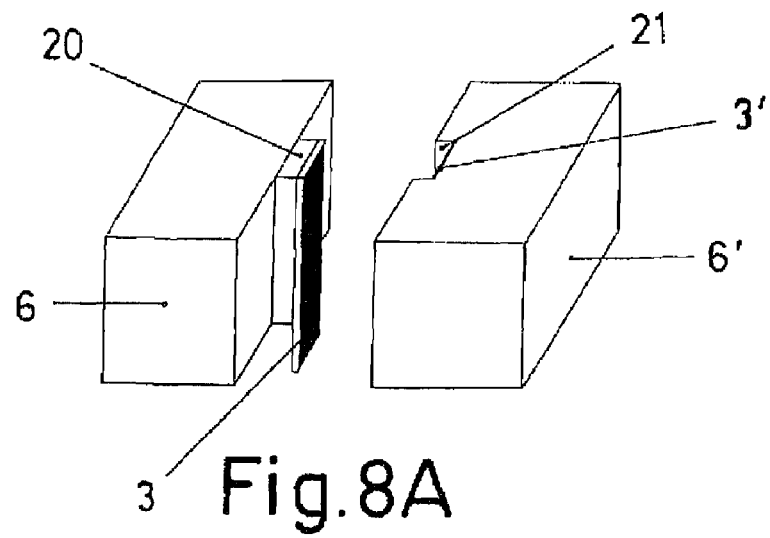
FIGS. 8A, 8B and 8C schematically show a sequence of the process for joining two fiber strips by means of the mobile modules of the splicer.
Figure 8B:
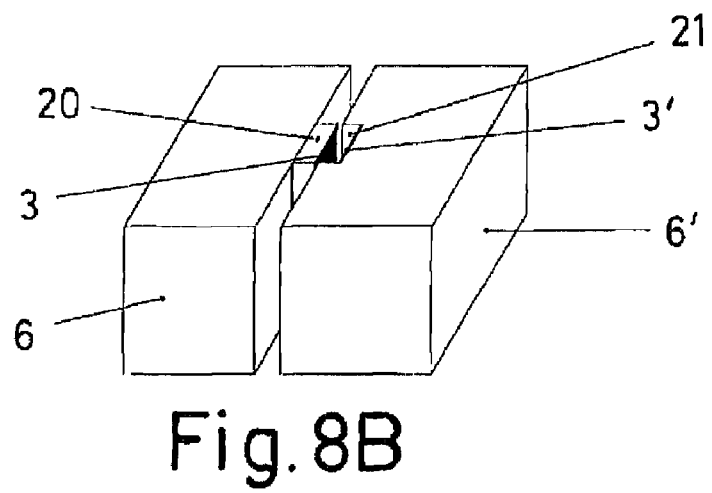
Figure 8C:
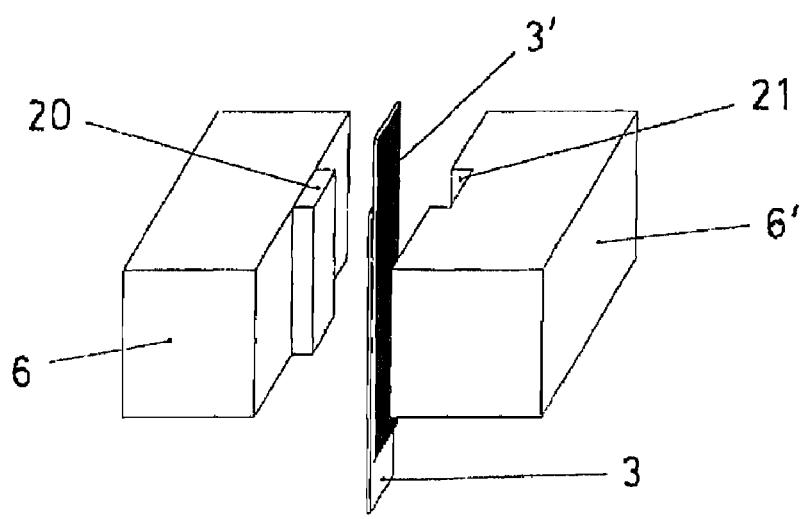

Therefore, as can be observed in the sequence of FIGS. 8A, 8B and 8C, during the splicing, the fiber strips (3, 3') are compressed between said conformations (20 and 21). In the splicing operation, the joint section of the fiber strips (3, 3') is inserted in the recess (21), wherein the material is prevented from being deformed towards the sides due to the pressure exerted for the joining, the joint therefore being maintained with the same width as the fiber strips (3, 3') spliced together.

The invention claimed is:

1. A splicer for splicing two fiber strips, an end of one of the fiber strips from an ending reel to a start of the other of the fiber strips from a stand-by reel, comprising:
    a frame;
    a guide mounted on the frame;
    two opposing modules, each movably mounted on the guide;
    two linear actuators, one of each of the actuators associated with one of each of the modules, for moving the modules into and out of splicing engagement with each other;
    two heater means, one of each of the heaters mounted in one of each of the modules for heating the fiber strips during splicing;
    two cutting blades, one of each of the cutting blades movably mounted in one of each of the modules, for cutting the one of the fiber strips from the ending reel during splicing;
    two opposing bases, one of each of the bases mounted on one of each of the modules, each of the bases having a front-side protrusion which faces the opposing base;
    two supports, one of each of the supports tiltably mounted on one of each of the bases;
    two catches, one of each of the catches mounted in one of each of the supports, for holding the start of the other of the fiber strips from the stand-by roll and for releasing the start when the front-side protrusion engages one of the catches;
    a block movably mounted on the frame, the block movably mounted below the modules, the block having
    two upward faces, one of each of the faces for supporting one of each of the modules; and
    two elastic dollies, one of each of the dollies mounted on one of each of the upward faces of the block, such that when the block moves into engagement with the modules and the modules are moved into engagement with each other, the cutting blades are aligned with the dollies, the fiber strips are positioned between the modules and between the upward faces of the block and the modules for splicing, and one of the front-side protrusions engages one of the catches to release the start of the other of the fiber strips.

2. A splicer for splicing two fiber strips, an end of one of the fiber strips from an ending reel to a start of the other of the fiber strips from a stand-by reel, comprising:
    a frame;
    a guide mounted on the frame;
    two opposing modules, each movably mounted on the guide;
    a recess in one of the modules, the recess having a width dimension of the fiber strips;
    a projection on the other of the modules and opposing the recess in the one of the modules, the projection having a width dimension within the width dimension of the recess;
    two linear actuators, one of each of the actuators associated with one of each of the modules, for moving the modules into and out of splicing engagement with each other;
    two heater means, one of each of the heaters mounted in one of each of the modules for heating the fiber strips during splicing;
    two cutting blades, one of each of the cutting blades movably mounted in one of each of the modules, for cutting the one of the fiber strips from the ending reel during splicing;
    two catches, one of each of the catches mounted in one of each of the modules, for holding the start of the other of the fiber strips from the standby roll;
    a block movably mounted on the frame, the block movably mounted below the modules, the block having two upward faces, one of each of the faces for supporting one of each of the modules; and
    two elastic dollies, one of each of the dollies mounted on one of each of the upward faces of the block, such that when the modules are moved into engagement with each other and the block moved into engagement with the modules, the cutting blades are aligned with the dollies, the fiber strips are positioned between the modules in the recess, the projection is also in the recess, and the fiber strips are between the upward faces of the block and the modules for splicing.

* * * * *